(12) United States Patent
Lajiness

(10) Patent No.: US 7,635,225 B2
(45) Date of Patent: Dec. 22, 2009

(54) POSITIVE DISPLACEMENT LUBRICATION DEVICE

(75) Inventor: Daniel Lajiness, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 477 days.

(21) Appl. No.: 11/463,837

(22) Filed: Aug. 10, 2006

(65) Prior Publication Data

US 2007/0068736 A1    Mar. 29, 2007

Related U.S. Application Data

(60) Provisional application No. 60/596,098, filed on Aug. 31, 2005.

(51) Int. Cl.
*F16C 33/66* (2006.01)
(52) U.S. Cl. ........................ 384/472; 384/462
(58) Field of Classification Search .......... 384/432–475
See application file for complete search history.

(56) References Cited

U.S. PATENT DOCUMENTS

| | | | | |
|---|---|---|---|---|
| 1,954,685 A | * | 4/1934 | Stanton | 384/472 |
| 2,439,709 A | * | 4/1948 | Asbury | 384/472 |
| 2,447,671 A | * | 8/1948 | Schuck | 384/468 |
| 2,998,287 A | * | 8/1961 | Pritchett | 384/466 |
| 3,090,656 A | * | 5/1963 | Lewis et al. | 384/472 |
| 5,150,769 A | * | 9/1992 | Major et al. | 184/31 |
| 5,150,975 A | * | 9/1992 | Major et al. | 384/465 |

* cited by examiner

*Primary Examiner*—Thomas R Hannon
(74) *Attorney, Agent, or Firm*—Watchstone P+D, PLLC

(57) ABSTRACT

A positive displacement lubrication system is disclosed that includes a rotatable shaft, a bearing, and a centrifugal force generating lubrication member that is mounted on the shaft for rotation with the shaft. The centrifugal force generator is spaced from the bearing member. A labyrinthine lubricant flow passage extends from the bearing, through a space between the bearing and the centrifugal force generating member, to the outlet member. Among other things, the system and method provides an efficient method of actively managing bearing lubrication and removal of lubricant, while also acting to seal off bearing areas from leaking. The positive displacement devices can be used for both grease and oil mist lubrication systems. They can also operate under heavy thrust loads when used to support the bearings.

6 Claims, 6 Drawing Sheets

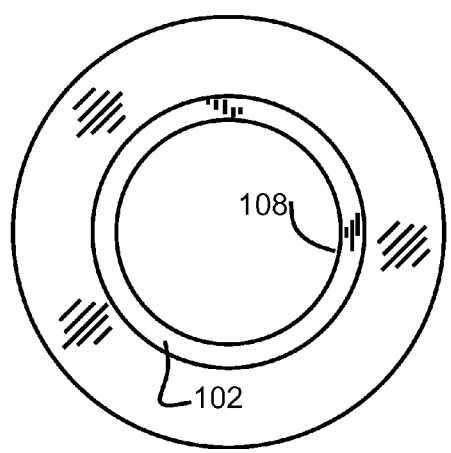
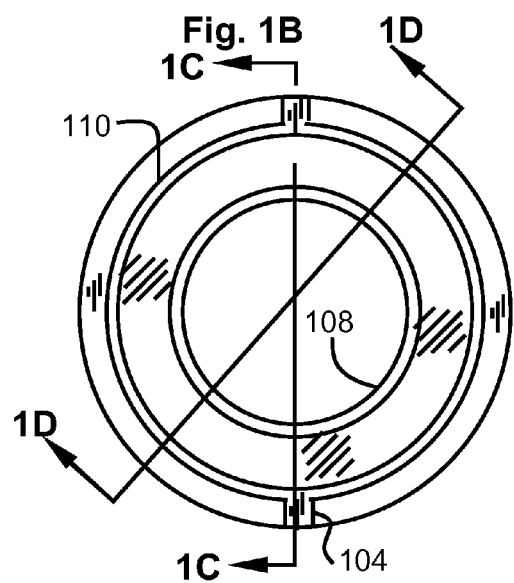
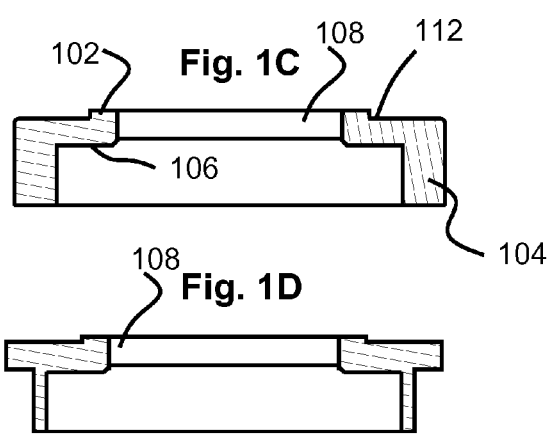
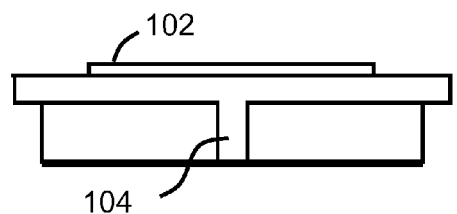
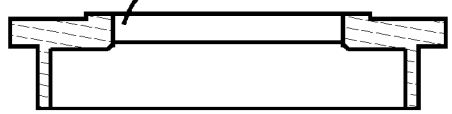

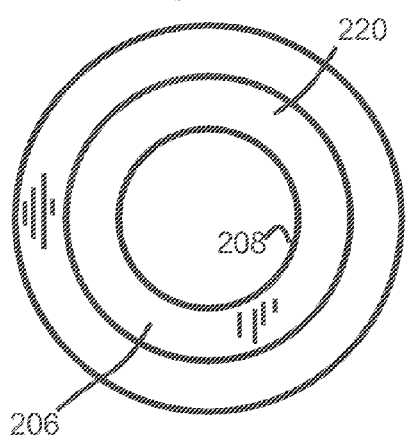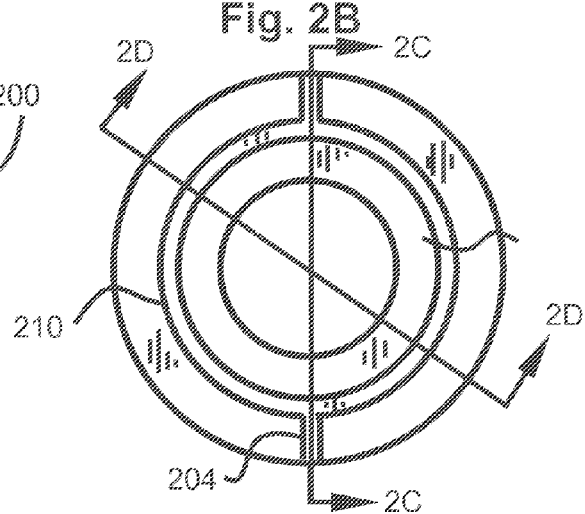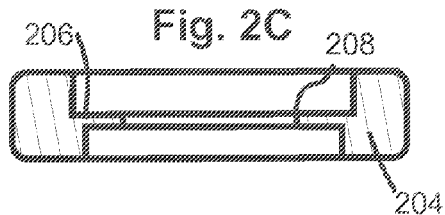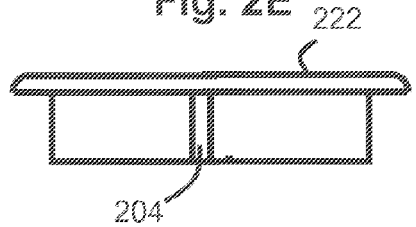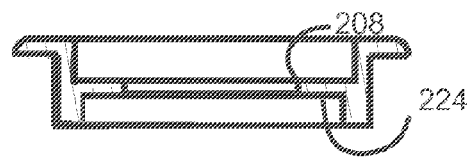

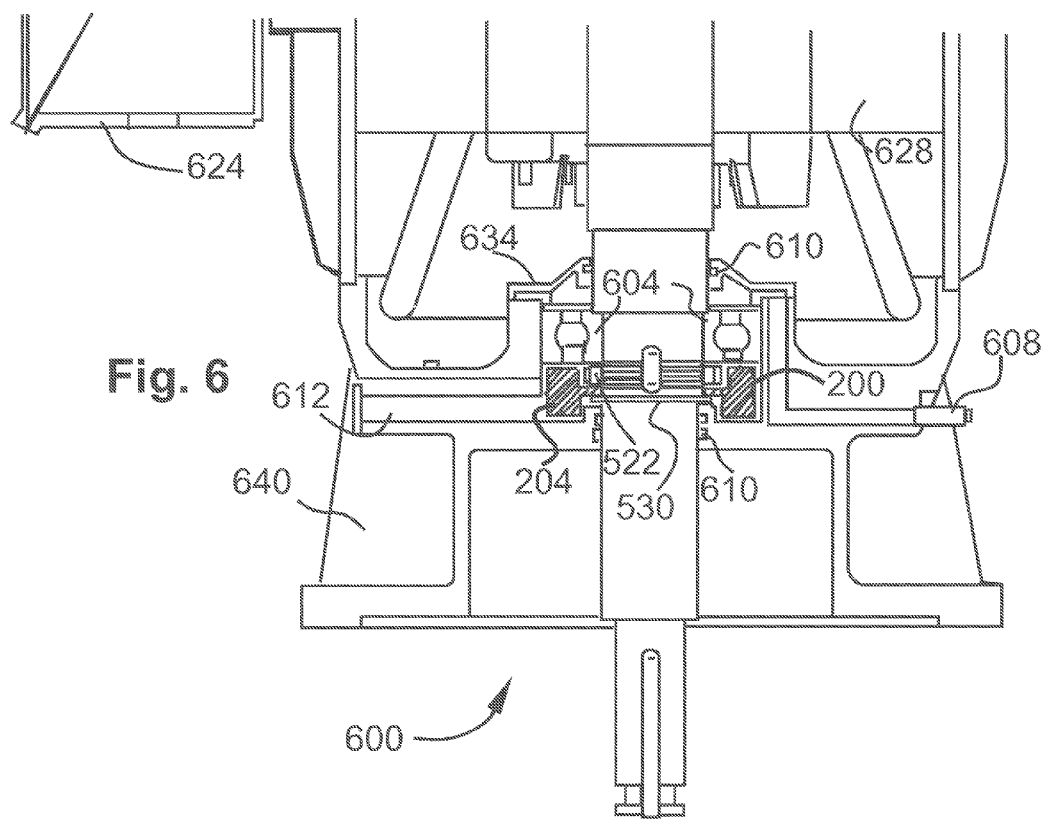

POSITIVE DISPLACEMENT LUBRICATION DEVICE

The present application claims priority under 35 U.S.C. 119 to U.S. Provisional Patent Application Ser. No. 60/596,098, to Daniel Lajiness, filed on Aug. 31, 2005, the entire disclosure of which is incorporated herein by reference.

BACKGROUND

1. Field of the Invention

The present application relates to lubrication of bearings and the like, and, in some preferred embodiments, to methods of positive displacement lubrication of motors or the like that require retention and removal of lubricant within a bearing and/or the like.

2. Background Discussion

Electric motors, and other devices, are often greased or lubricated at the time of manufacture. If a motor has been stored for a long period time (such as, e.g., six months or more), it is commonly lubricated prior to initiating use—such as, e.g., using a standard hand-held grease gun. Under some conditions, grease leakage can occur around a motor shaft hole or the like (such as, e.g., in the event of over-packing of grease).

Lubrication of electric motors is also commonly performed as part of a planned maintenance program. Greasing and lubrication can often lead to accumulation of dirt and cleanliness problems. Accordingly, prior to greasing, one typically needs to be sure that fittings are free from dirt and that one always re-lubricates using grease that is also free from contamination. In some instances, motors may be equipped with an automatic grease relief fitting, a grease plug or a grease cover plate for the outlet. In some cases, it may be necessary to remove an automatic type relief fitting due to hardening of grease. Moreover, motors utilizing a grease plate may require the scraping out of old grease periodically.

In summary, electronic motors and other devices having lubricated bearings and/or the like face complexities in maintaining desired lubrication levels and in maintaining cleanliness and operability of the devices.

With respect to vertically-oriented bearing arrangements, such arrangements often experience significant problems in relation to maintaining proper lubrication levels within the bearing because gravity tends to act to pull the lubrication prematurely out of the bearing cavity. In addition, these vertical bearing arrangements also confront problems when seeking to remove used lubricant or to keep such lubricants from building up and/or clogging upon the bearings and/or leaking into areas other than the removal chamber.

While a variety of lubrication systems and methods are known, there remains a need for improved systems and methods.

SUMMARY OF THE PREFERRED EMBODIMENTS

The preferred embodiments of the present invention can significantly improve upon existing methods and/or apparatuses. Among other things, the preferred embodiments can provide an extended usable life of bearings that are subjected to loss of lubricant, in particular bearings whose loss of lubricant is exacerbated by gravitational flow of lubricant.

A positive displacement lubrication system is disclosed that includes a rotatable shaft, a bearing, and a centrifugal force generating lubrication member that is mounted on the shaft for rotation with the shaft. The centrifugal force generator is spaced from the bearing member. A labyrinthine lubricant flow passage extends from the bearing, through a space between the bearing and the centrifugal force generating member, to said outlet member. Among other things, the system and method provides an efficient method of actively managing bearing lubrication and removal of lubricant, while also acting to seal off bearing areas from leaking. The positive displacement devices can be used for both grease and oil mist lubrication systems. They can also operate under heavy thrust loads when used to support the bearings.

One aspect of the disclosure relates to a lubrication system that includes a positive displacement lubrication member that is mounted on a rotatable shaft for rotation with the shaft. The positive displacement member has paddles that apply a centrifugal force to lubricant that exists a bearing and travels through a labyrinthine lubricant flow passage from the bearing, towards the positive displacement lubrication member, and to a lubricant outlet, where it exits the system.

Another aspect is the spacing of the positive displacement lubrication member from the bearing on the order of about 2 mm. The spacing can be modified to meet specific requirements of the system.

In still another aspect of the disclosure a positive displacement lubrication member spaced from the bearing with a raised region adjacent to the shaft, and in contact with the bearing. The raised region provides a space between the bearing and the centrifugal force generator. The labyrinthine lubricant flow passage is formed by slightly spacing a centrifugal force generator from the bearing. The centrifugal force generator is spaced from the bearing a distance of about 2 mm. The lubrication device includes a seal member that is sealingly secured to the shaft and forms, in combination with the bearing a lubricant tight seal that restricts lubricant flow from the bearing to the shaft. The seal member has a longitudinally extending region that is in lubricant tight contact with the shaft. At least a portion of the seal member has a longitudinally extending region that is positioned between a paddle member and the shaft.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 1A is an end view of the obverse end of a positive displacement lubrication device;

FIG. 1B is an end view of the inverse end of positive displacement lubrication device of FIG. 1A;

FIG. 1C is a cross of the positive displacement lubrication device of FIG. 1B, taken along line 1C-1C;

FIG. 1D is a cross of the positive displacement lubrication device of FIG. 1B, taken along line 1D-1D;

FIG. 1E is a side view of the positive displacement lubrication device of FIG. 1A;

FIG. 2A is an end view of the obverse end of another type positive displacement lubrication device;

FIG. 2B is an end view of the inverse side of positive displacement lubrication device of FIG. 2A;

FIG. 2C is a cross sectional side view of positive displacement lubrication device of FIG. 2B, taken along line 2C-2C;

FIG. 2D is a cross sectional side view of positive displacement lubrication device of FIG. 2B, taken along line 2D-2D;

FIG. 2E is a side view of the positive displacement lubrication device of FIG. 2A;

FIG. 6 is an enlarged view of the drive end of the motor of FIG. 3.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Figure 5:
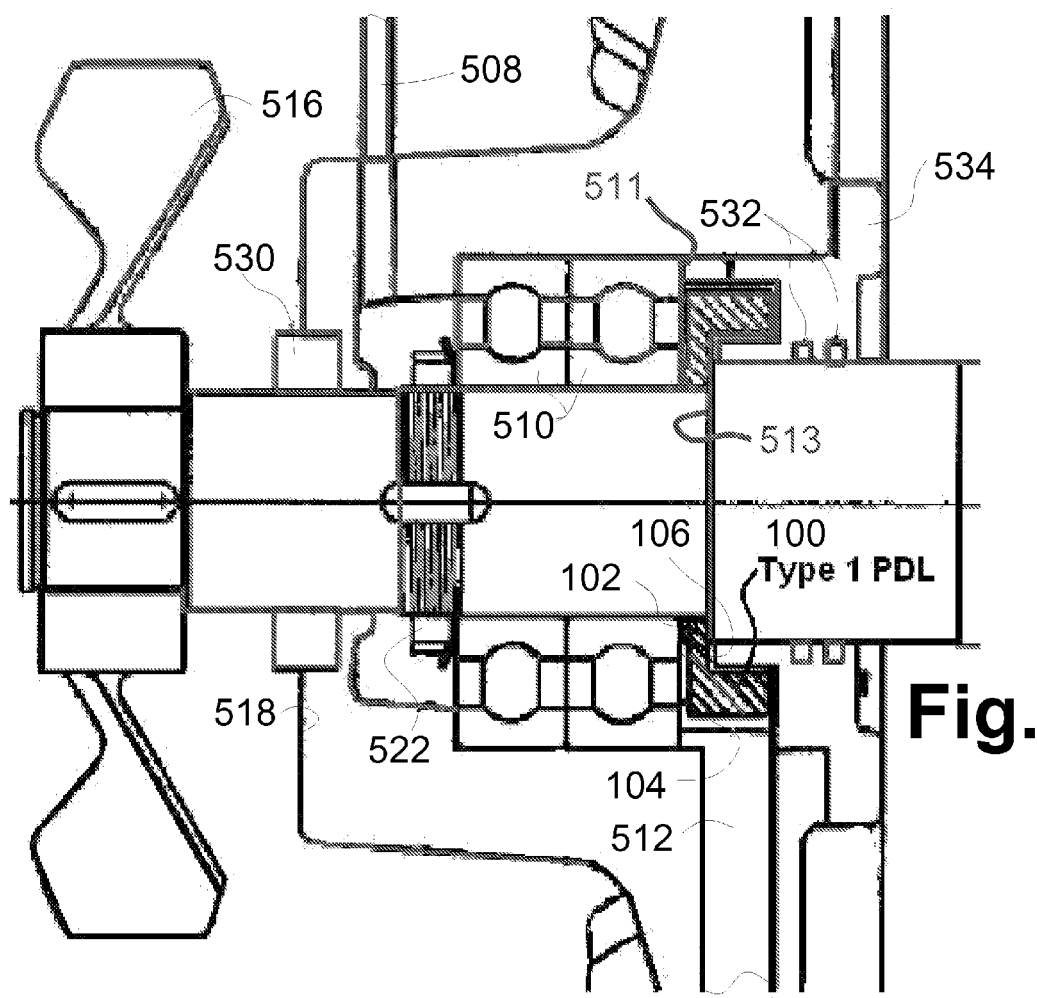
FIG. 5 is an enlarged view of a portion of the section of the motor of FIG. 4.

A first positive displacement lubrication device design, fits between a lower bearing face and the shaft shoulder 106, as shown in FIG. 5. A second positive displacement lubrication device design performs the similar functions to the first, while being able to fit over a bearing locknut on the lower face of the bearing, as shown in FIG. 6. In some embodiments, a positive displacement lubrication device can be applied to vertical bearing arrangements, or horizontal bearing arrangements that have similar lubrication issues. The positive displacement lubrication device is preferably installed such that it spins in the same direction and at the same speed as the bearings. In the preferred embodiments, since the device spins with the bearings, the centrifugal force keeps the used lubrication moving outward and from backing up into the bearings.

In the preferred embodiments, the device actively manages bearing lubrication and removal while also acting to seal off areas from leaking. It can preferably be used for both grease and oil mist lubrication systems. In addition, in some embodiments, it can also operate under heavy thrust loads when used to support the bearing(s). Other systems are forced to use thicker grease to help slow the removal of lubrication from the bearings by gravity. However, those greases are non-standard, may still not maintain proper lubrication levels in the bearing (s), and can have problems when used grease removal. Also, other sealing methods do not actively remove lubrication from the area to be sealed. The positive displacement lubrication device allows for these areas to be sealed without direct shaft contact which can reduce efficiency and which can damage the shaft.

The preferred embodiments can be implemented in a variety of environments, such as, e.g., with various machinery that have bearings arranged with the rotating axis in the vertical plane and similar lubrication issues.

Illustrative Examples

Looking now to FIG. 1(A-E), and FIG. 2(A-E), preferably, below and perpendicular to a surface of the positive displacement lubrication device are "paddles" or "tabs" that actively remove the used lubrication from the cavity below the bearings and project it into the outlet chamber. Preferably, also below and perpendicular to a surface of the positive displacement lubrication device, and concentric to the mounting bore, is a ring that has an outer diameter that is connected to the "tabs" and sized to stop the lubrication from being "pushed" into the shaft area and leaking into the motor.

The positive displacement lubrication device is preferably sized such that there is a small clearance between the device and the surrounding parts, including bearings, such that lubrication flow is directed solely towards an outlet chamber. The flow of lubricant is impeded sufficiently to facilitate the maintenance of proper levels of lubricant within the bearings, while restricting lubricant build up and the consequent "choking" of the system. The combination of a small clearance along and a labyrinth path to the shaft area, effectively contribute to the prevention of lubricant from leaking into the motor.

Now, looking to FIGS. 3, 4, 5, and 6 the positive displacement lubrication device described in this application employs a small gap below the bearing, to slow the rate of lubricant removal. The figures also show "paddles" that actively distribute the used lubricant to the outlet chamber, thus providing for ease of removal of lubricant. The device creates a tight, labyrinthine lubrication path that effectively seals off areas proximate a bearing while permitting flow to a removal chamber. A removal chamber is a region between a positive displacement lubrication (PDL) device, and a lubricant outlet.

In some preferred embodiments, there are two configurations of positive displacement lubrication devices. The first type of PDL, indicated generally as 100, in FIGS. 1A, B, C, D and E, and as best seen in FIG. 5, fits between lower bearing face 511 of bearings 510 and shaft shoulder 513. The other design, indicated generally as 200 in FIGS. 2A, B, C, D and E, performs the same functions as PDL 100, while being able to fit over a bearing locknut 522. Locknut 522 is positioned at the lower face of the lower bearing 604, as shown in FIG. 6, surface 206 of PDL 200, and is in contact with snap ring 530.

As shown in FIGS. 5 and 6, PDL 100 can be, e.g., located at the end of the motor that houses fan 516, and PDL 200 can be, e.g., located at the motor drive end.

The positive displacement lubrication (PDL) device 100, as shown in FIG. 1 and the PDL 200, as shown FIG. 2, can be applied to vertical bearing arrangements, and to horizontal bearing arrangements having similar lubrication issues, such as, e.g., gravity driven flow.

The PDL devices 100 and 200 are installed such that they spin in the same direction and at the same speed as the shaft, and bearings 510 and 604, respectively. As shown in FIG. 1C, surface 112 of the positive lubrication device indicated generally as 100, is parallel to and slightly offset form the bottom face of the bearing 510.

Similarly, surface 220 of the lubrication device indicated generally as 200 in FIG. 2B, is parallel to and slightly offset from the bottom face of the bearing 604. The slight offset between surface 220 of PDL 200, and the bearing 604, enables used lubricant to exit the bearing while impeding the discharge flow of lubricant sufficiently to enable lubricant levels to be maintained within the bearings for an extended period of time, thus extending the life of the bearing. Since the device spins with the bearings, the centrifugal force keeps the used lubricant moving outwardly, and from backing up into the bearings.

Below and perpendicular to surface of the PDL devices 100 and 200, are "paddles" or "tabs" 104 of FIGS. 1, and 204 of FIG. 2. The tabs 104 are about 6.35 mm thick and about 19 mm in height and about 6.5 mm in width. The diameter of PDL 100 is about 95 mm. The diameter of PDL 100 is about 95 mm. The tabs 204 are about 6.35 mm thick, about 24 mm in height, and about 14.4 mm in width. The diameter of PDL 200 is about 125 mm. While one tab can be used, preferably two tabs are provided. A greater number of tabs can also be used. It is noted that dimensions specified herein can range about +/−10% in some illustrative and non-limiting examples, and, in other embodiments, can range about +/−20%. In other illustrative and non-limiting examples, the dimensions of various parts can vary more substantially depending on circumstances.

The paddles generate a centrifugal force that actively removes the used lubricant from the cavity below the bearings 510 and 604 and projects the lubricant into the lubricant outlet chambers 512 and 612, respectively. Lubricant is delivered to bearing 510 through lubricant inlet 512. Similarly, lubricant is delivered to bearing 604 through an inlet 608. Sealing ring 110 is below, perpendicular to surface 106, and concentric to the mounting bore 108. Tabs 104 are connected to the outer surface of sealing ring 110, which is sized to stop the lubricant from being "pushed" into the area of shaft 540 and leaking into the motor. Preferably, the tabs 104 of PDL 100, and 204 of PDL 200, advantageously, are formed integrally with their respective PDLs, but components can be assembled by welding or other bonding means. In the most preferred instances, PDL 100 and PDL 200, are unitary, or integral devices.

Figure 3:
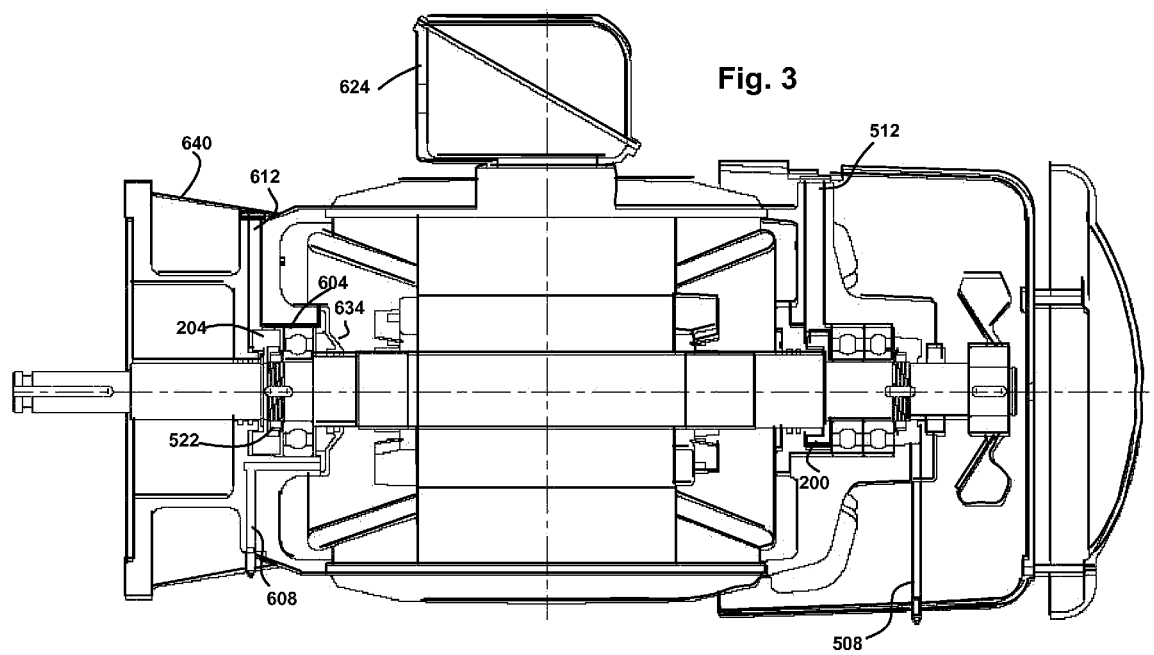
FIG. 3 is a cross-sectional view of a vertical motor from the drive end to the end opposite the drive end, and showing the positive displacement devices of FIG. 1A and FIG. 2A.
Figure 4:
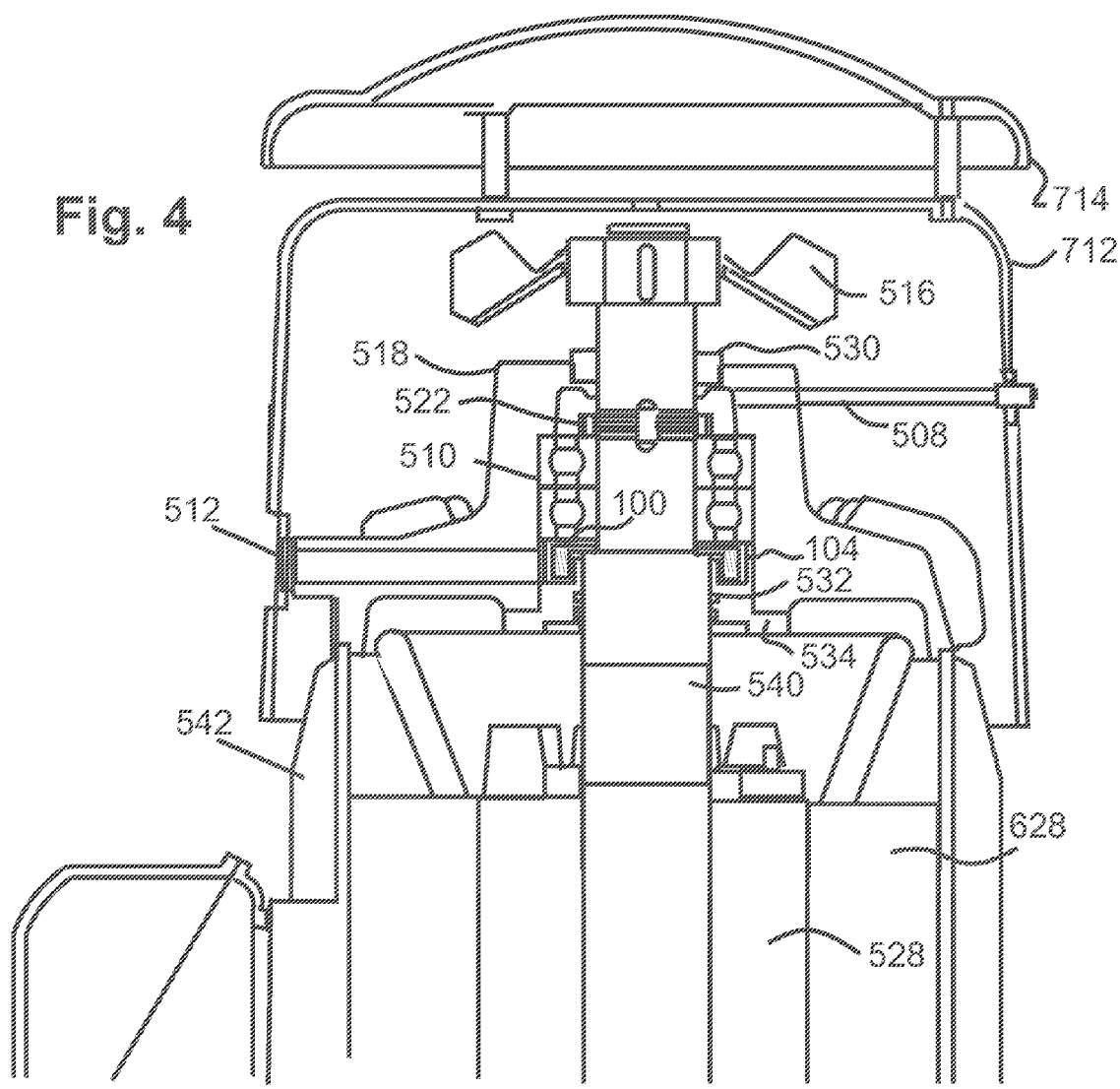
FIG. 4 is an enlarged view of the end opposite the drive end of the vertical motor of FIG. 3.

FIG. 4 shows additional fan end components such as canopy cap 714, fan cover 712, frame member 542, stator 628 and rotor 528.

As shown in FIG. 5, PDL device 100 is sized such that there is a small clearance between the device and the surrounding parts, such that lubrication flow is directed solely towards the outlet chamber 512, such that it impedes the flow of lubrication enough to help maintain the proper levels within the bearings 510, but such that it does not allow lubricant to build up and "choke" the system. Preferably, the raised surface 102 of PDL 100 is in lubricant tight contact with bearing 510, and, accordingly, the clearance between the PDL 100 and 510 is equal to the height difference between PDL 100 surface 112 and surface 102. The term "lubricant tight contact" refers a contact between components that essentially prevents lubricant flow between the components. The term "lubricant tight contact" is not limited to absolute prevention of lubricant migration between components, but rather is inclusive of a very minimal lubricant migration between components. As noted above, the small clearance is preferably about 2 mm. The small clearance, along with the labyrinth path from bearing 510 to the shaft area, effectively blocks lubricant from leaking into the motor.

FIG. 5 illustrates additional components of the end of the motor in which the fan 516 is housed, as for example, a bearing bracket 518 can be provided. FIG. 5 additionally shows bearing locknut/lockwasher 522. The bearing 510 is secured between bearing locknut/lockwasher 522 and raised surface 102 of PDL 100. Felt strips 532 are provided between inner bearing cap 534 and shaft 542.

Preferably, tabs 104 and 204 are sized to stop the lubricant from being "pushed" into the area of shaft and leaking into the motor. The PDL devices 100 and 200 are sized such that there is a small clearance between the device and the surrounding parts, such that lubrication flow is directed solely towards the outlets 512 and 612, respectively, and such that it impedes the flow of lubricant enough to help maintain the proper levels within the bearings 510 and 604, respectively. The labyrinthine path and small clearance does not allow lubricant to build up and "choke" the system.

FIG. 6 illustrates additional components of the motor drive end, indicated generally as 600 according to some illustrative embodiments. In this example, inner bearing cap 634 is positioned above bearing 604, as illustrated in FIG. 6 and p-flange member 640 is located at the outermost end of the drive end. A terminal box 624 is shown in part in FIG. 4 and in part in FIG. 6. Lubrication inlet 608 provides lubricant to bearing 604 and outlet 612, and provides an exit for spent lubricant. A felt strip 610 is provided between shaft 540 and a bearing bracket.

The positive displacement lubrication devices 100 and 200, actively manage bearing lubrication and removal of lubricant, while also acting to seal off bearing areas from leaking. Positive displacement devices can be used for both grease and oil mist lubrication systems. They can also operate under heavy thrust loads when used to support the bearings. Other systems are forced to use thicker greases to help slow the removal of lubrication from the bearings by gravity, but these greases are non-standard, may still not maintain proper lubrication levels in the bearings, and can have problems with used grease removal. Additionally, other sealing methods do not actively remove lubrication from the area to be sealed. In addition, the PDL devices enable the bearing areas to be sealed without a direct shaft contact that can reduce efficiency and damage the shaft.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

GLOSSARY OF TERMS

100 PDL type 1
102 surface of PDL type 1 for mounting flush to bearing inner ring face
104 paddle tabs
106 inner surface of PDL 100 for mounting flush to shaft shoulder
108 shaft mounting bore
110 sealing ring
112 surface of PDL 100 that is spaced from bearing 510
200 PDL type 2
202 surface of PDL 2 for mounting flush to the bearing locknut face
204 paddle tabs
206 inner surface mounts flush to bearing inner ring face
208 shaft mounting bore
210 sealing ring
220 surface of PDL 200 that mounts flush to bearing locknut face
222 surface of obverse side
224 surface of PDL 200 for mounting flush to snap ring support 630
508 lubrication inlet
510 bearings
512 lubrication outlet
516 fan
518 bearing bracket
522 bearing locknut/lockwasher
528 rotor
530 snap ring
532 felt strips
534 inner bearing cap
540 shaft
542 frame
602 paddle
604 bearing
608 lubrication inlet
628 stator
610 felt strip
612 lubrication outlet
624 terminal box
628 stator
634 inner bearing cap
640 P-flange bearing bracket
712 fan cover
714 canopy cap

What is claimed is:

1. A lubrication system, comprising:
a bearing, a lubrication member, and a rotatable shaft, said lubrication member being mounted on said shaft for rotation with said shaft, said lubrication member being generally circular and extending radially from said shaft, said lubrication member having at least one paddle member, said at least on paddle member being in a plane that is radially oriented with respect to the central axis of said shaft, and a spacer member, said spacer member maintaining said lubrication member a predetermined fixed distance from said bearing;
wherein said spacer member is a raised region on said lubrication member, said raised region having a radial length that is substantially less than the radial extend of said circular member and a longitudinal extent sufficient to provide a slight space between said circular member and said bearing, said lubrication member being in lubricant tight contact with said shaft and with said bearing, a lubricant outlet member, and a labyrinthine lubricant flow passage, said lubricant flow passage extending from said bearing, through said slight space, to said outlet member;
further comprising a seal member sealingly secured to said shaft and forming, in combination with said bearing, a lubricant tight seal that confines lubricant flow from said bearing to said shaft, said seal member having a longitudinally extending region that is in lubricant tight contact with said shaft, at least a portion of said seal member longitudinally extending region being positioned between said at least one paddle member and said shaft.

2. A lubrication device, comprising:
a rotatable shaft;
a bearing mounted on said shaft;
a centrifugal force generating member in lubricant tight engagement with said shaft and mounted on said shaft for rotation with said shaft; and
spacer means between said centrifugal force generating member and a first side of said bearing, and a lubricant outlet;
wherein said centrifugal force generating member is substantially circular and said shaft extends through a central shaft bore in said centrifugal force generating member, said centrifugal force generating member extending radially from said shaft, and at least one paddle member extending longitudinally from said centrifugal force generating member.

3. The lubrication device of claim 2, wherein said centrifugal force generator is spaced from said bearing a distance of about 2 mm.

4. The lubrication device of claim 2, wherein:
said spacer means is a raised region on said radially extending centrifugal force generator,
said raised region having a radial length that is substantially less than the radial extent of said centrifugal force generating member, and forming a slight space between said bearing and said centrifugal force generating member,
said raised region being in lubricant tight engagement with said bearing, and
a labyrinthine lubricant flow passage extending from said bearing, through said slight space between said bearing and centrifugal force generating member to said outlet.

5. The lubrication device of claim 4, further comprising a lubricant inlet, said lubricant inlet being positioned to deliver lubricant to a second side of said bearing, and wherein lubricant flow is from said lubricant inlet to said bearing second side, through said bearing to a first side of said to said labyrinthine lubricant flow passage, and to said outlet.

6. The lubrication device of claim 5, wherein said centrifugal force generator is spaced from said bearing a distance of about 2 mm.

* * * * *